3,123,529
PARENTERAL COMPOSITIONS CONTAINING BENZODIAZEPINES

John Kariss, Clifton, and Harold Leon Newmark, Maplewood, N.J., assignors to Hoffmann-La Roche Inc., Nutley, N.J., a corporation of New Jersey
No Drawing. Filed Mar. 9, 1962, Ser. No. 178,559
11 Claims. (Cl. 167—58)

The present invention relates to parenterally acceptable aqueous diluents for physiologically active compounds of the benzodiazepine type and to parenteral solutions containing these compounds.

Benzodiazepines having the following formula (I)

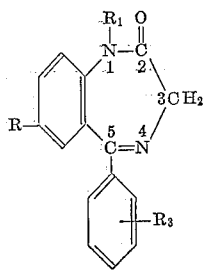

wherein R is halogen, trifluoromethyl, or nitro; $R_1$ is hydrogen or lower alkyl, e.g., methyl; and $R_3$ is hydrogen, trifluoromethyl, or halogen; and the corresponding 4-oxide and 4,5-dihydro derivatives are useful as muscle relaxants, anticonvulsants, and tranquilizers. The term halogen used above includes fluorine, chlorine, bromine, and iodine.

For many applications parenteral solutions of the above compounds are desired. However, the above compounds have a very low solubility in the usual parenteral diluents, and accordingly, parenteral solutions of these compounds generally cannot be formed to contain a sufficient quantity of the compound to be medically useful.

The present invention relates to novel parenterally acceptable diluents for the above benzodiazepines which will dissolve a sufficient quantity of a benzodiazepine to form solutions thereof which are medically useful.

Examples of the benzodiazepines which are solubilized by the parenterally acceptable diluents of the invention include:

7 - chloro - 2 - oxo - 5 - phenyl-1,2,4,5-tetrahydro-3H-1,4-benzodiazepine,
7 - chloro - 1 - methyl - 5 - phenyl-3H-1,4-benzodiazepin-2(1H)-one, 4-oxide,
7 - chloro - 5 - (2 - chlorophenyl)-3H-1,4-benzodiazepin-2(1H)-one,
7 - chloro - 1 - methyl - 5 - phenyl-3H-1,4-benzodiazepin-2(1H)-one,
7 - nitro - 5 - (2 - chlorophenyl) - 3H-1,4-benzodiazepin-2(1H)-one,
7 - chloro - 2 - oxo - 5 - phenyl-1,2-dihydro-3H-1,4-benzodiazepine,
7-nitro-5-phenyl-3H-1,4-benzodiazepin-2(1H)-one,
7 - nitro - 5 - ($\alpha,\alpha,\alpha$ - trifluoro-o-tolyl)-3H-benzodiazepin-2(1H)-one,
7 - nitro - 1 - methyl - 5 - (2-fluorophenyl)-3H-1,4-benzodiazepin-2(1H)-one,
5 - phenyl - 7 - trifluoromethyl - 3H - 1,4 - benzodiazepin-2(1H)-one,
7 - chloro - 2 - oxo - 5 - phenyl-1,2-dihydro-3H-1,4-benzodiazepine 4-oxide, etc.

The novel parenterally acceptable diluent systems of the invention contain (1) from about 30% to about 80% parenterally acceptable water; (2) from about 0% to about 70% propylene glycol; (3) from about 0% to about 70% glycerine; however, the total quantity of propylene glycol plus glycerine must be in the range of about 20% to about 70%, preferably about 20% to about 60%, i.e., the diluent compositions must contain from about 20% to about 70% of propylene glycol alone, glycerine alone, or a mixture of propylene glycol and glycerine in any proportion, such that the total quantity of the two components falls within the range of about 20% to about 70%; and (4) a complexing agent, the quantity of which will depend on the particular complexing agent chosen. The following table lists the complexing agents that can be used in the diluent compositions of the invention with the quantities to be employed therein:

| Complexing Agent | Quantity Employed |
| --- | --- |
| (a) Sodium benzoate, or a mixture of sodium benzoate and benzoic acid containing up to about 50% benzoic acid. | About 1% to about 10%, preferably about 5%. |
| (b) Sodium mandelate, or a mixture of sodium mandelate and mandelic acid containing up to about 50% mandelic acid. | Do. |
| (c) Gentisic acid ethanolamide. | About 1% to about 4%, preferably about 3%. |
| (d) Dimethyl acetamide. | About 2% to about 20%, preferably about 10%. |
| (e) Polysorbate 80 [1]. | About 0.5% to about 4%, preferably about 3%. |
| (f) Phthalimide. | About 0.1% to about 0.4%, preferably about 0.3%. |
| (g) Sodium salicylate, or a mixture of sodium salicylate and salicylic acid containing up to 50% salicylic acid. | About 1% to about 10%, preferably about 5%. |

[1] Polysorbate 80 is polyoxyethylene sorbitan mono-oleate.

An optional but preferred component of the diluent compositions is from about 1% to about 40%, preferably about 5% to about 20%, ethanol. Small quantities of other ingredients such as the commonly used parenteral preservatives, e.g., benzyl alcohol, phenol, cresol, esters of parahydroxy benzoic acid, etc. can be optionally employed.

The percentages given above and elsewhere in the application are percentages by weight and are based on the total weight of the diluent composition unless otherwise noted.

The invention in another of its aspects relates to a solution of a benzodiazepine in a diluent of the invention. The weight of a benzodiazepine which is employed per cc. of diluent will, in general, range from about 0.5 to about 10 mg., preferably about 1 to about 5 mg. In some cases the upper limit of the above range will be determined by the maximum solubility of the compound in the diluent, which may be less than the upper limit given above.

The solutions of benzodiazepines of the invention are useful for parenteral injection where rapid action is required or oral administration is not feasible. Routes of parenteral injection include intramuscularly, subcutaneously, intravenously, and intraperitoneally.

The quantity of a parenteral benzodiazepine solution of the invention which is administered to a patient will depend on the particular benzodiazepine employed, the particular diagnosis, the response of the person, the age and body weight of the patient, etc. In a typical adult dosage a sufficient quantity of parenteral solution of a benzodiazepine will be given to provide from about 0.5 to about 25 mg., e.g. about 0.5 to about 10 mg. of a benzodiazepine of the invention.

The invention will be better understood from the following examples which are given for illustration purposes only and are not meant to limit the invention.

Example 1

An aqueous diluent suitable for parenteral use is prepared by mixing the following ingredients together:

| | For each ml. of diluent |
|---|---|
| Propylene glycol | ml __ 0.400 |
| Ethyl alcohol | ml __ 0.100 |
| Benzyl alcohol | ml __ 0.015 |
| Sodium benzoate | mg __ 50.00 |
| Sterile water for injection, q.s. to 1 ml. | |

2 ml. of the above diluent is then mixed with 10 mg. of 7-chloro - 1 - methyl - 5 - phenyl-3H-1,4-benzodiazepin-2(1H)-one. The resulting solution, which is obtained by agitating the above compound and the diluent, is suitable for parenteral injection, e.g., intramuscularly.

In like manner solutions of at least 1 mg. of each of the following compounds are prepared per ml. of the above diluent:

7-chloro - 2 - oxo-5-phenyl-1,2,4,5-tetrahydro-3H-1,4-benzodiazepine, 7-chloro - 1 - methyl - 5 - phenyl-3H-1,4-benzodiazepin-2(1H)-one 4-oxide, 7-chloro - 5 - (2-chlorophenyl) - 3H - 1,4-benzodiazepin-2(1H)-one, 7-nitro - 5 - (2-chlorophenyl) - 3H - 1,4-benzodiazepin-2(1H)-one, 7-chloro - 2 - oxo - 5 - phenyl-1,2-dihydro-3H-1,4-benzodiazepine, 7-nitro - 5 - phenyl - 3H - 1,4-benzodiazepin-2(1H)-one, 7-nitro - 5 - (α,α,α-trifluoro-o-tolyl)-3H-benzodiazepin-2(1H)-one, 7-nitro - 1 - methyl - 5 - (2-fluorophenyl)-3H-1,4-benzodiazepin-2(1H)-one, 5-phenyl - 7 - trifluoromethyl - 3H - 1,4-benzodiazepin-2(1H)-one, 7-chloro - 2 - oxo - 5 - phenyl-1,2-dihydro-3H-1,4-benzodiazepine 4-oxide, etc.

Example 2

An aqueous diluent suitable for parenteral use is prepared from the following ingredients:

| | For each ml. of diluent |
|---|---|
| Propylene glycol | ml __ 0.400 |
| Ethyl alcohol | ml __ 0.100 |
| Benzyl alcohol | ml __ 0.015 |
| Dimethyl acetamide | ml __ 0.100 |
| Sterile water for injection, q.s. to 1 ml. | |

2 ml. of the above diluent is then mixed with 20 mg. of 7-chloro - 5 - phenyl-1-methyl-3H-1,4-benzodiazepin-2(1H)-one. The resulting solution is suitable for parenteral injection.

In like manner solutions of at least 1 mg. of each of the compounds given in Example 1 are prepared per ml. of the diluent of Example 2.

Example 3

An aqueous diluent suitable for parenteral use is prepared by mixing the following ingredients together:

| | For each ml. of diluent |
|---|---|
| Propylene glycol | ml __ 0.400 |
| Ethyl alcohol | ml __ 0.100 |
| Benzyl alcohol | ml __ 0.015 |
| Mandelic acid + sodium mandelate (50/50) | mg __ 50.00 |
| Sterile water for injection, q.s. to 1 ml. | |

2 ml. of the above diluent is then mixed with 10 mg. of 7-chloro - 5 - phenyl - 1 - methyl-3H-1,4-benzodiazepin-2(1H)-one, the resulting solution being suitable for parenteral injection.

In like manner solutions of at least 1 mg. of each of the compounds given in Example 1 are prepared per ml. of the diluent of Example 3.

Example 4

An aqueous diluent suitable for parenteral use is prepared by mixing the following ingredients together:

| | For each ml. of diluent |
|---|---|
| Propylene glycol | ml __ 0.400 |
| Ethyl alcohol | ml __ 0.100 |
| Benzyl alcohol | ml __ 0.015 |
| Gentisic acid ethanolamide | mg __ 30.00 |
| Sterile water for injection, q.s. to 1 ml. | |

2 ml. of the above diluent is then mixed with 10 mg. of 7-chloro - 5 - phenyl - 1 - methyl-3H-1,4-benzodiazepin-2(1H)-one, the resulting solution being suitable for parenteral injection.

In like manner solutions of at least 1 mg. of each of the compounds given in Example 1 are prepared per ml. of the diluent of Example 4.

Example 5

| | For each ml. of diluent |
|---|---|
| Propylene glycol | ml __ 0.400 |
| Ethyl alcohol | ml __ 0.100 |
| Benzyl alcohol | ml __ 0.015 |
| Sodium mandelate | mg __ 100.00 |
| Sterile water for injection, q.s. to 1 ml. | |

2 ml. of the above diluent is then mixed with 20 mg. of 7 - chloro - 5 - phenyl - 1 - methyl - 3H - 1,4 - benzodiazepin-2(1H)-one, the resulting solution being suitable for parenteral injection.

In like manner solutions of at least 1 mg. of each of the compounds given in Example 1 are prepared per ml. of the diluent of Example 5.

Example 6

A diluent suitable for parenteral use is prepared by mixing the following ingredients together:

| | For each ml. of diluent |
|---|---|
| Propylene glycol | ml __ 0.400 |
| Ethyl alcohol | ml __ 0.100 |
| Benzyl alcohol | ml __ 0.015 |
| Sodium benzoate | mg __ 20.00 |
| Benzoic acid | mg __ 20.00 |
| Sterile water for injection, q.s. to 1 ml. | |

2 ml. of the above diluent is then mixed with 10 mg. of 7 - chloro - 5 - phenyl - 1 - methyl - 3H - 1,4 - benzodiazepin-2(1H)-one, the resulting solution being suitable for parenteral injection.

In like manner solutions of at least 1 mg. of each of the compounds given in Example 1 are prepared per ml. of the diluent of Example 6.

Example 7

An aqueous diluent suitable for parenteral use is prepared by mixing the following ingredients together:

| | For each ml. of diluent |
|---|---|
| Propylene glycol | ml __ 0.400 |
| Ethyl alcohol | ml __ 0.100 |
| Benzyl alcohol | ml __ 0.015 |
| Sodium salicylate | mg __ 50.00 |
| Sterile water for injection, q.s. to 1 ml. | |

1 ml. of the above diluent is mixed with 5 mg. of 7-chloro - 1 - methyl - 5 - phenyl - 3H - 1,4 - benzodiazepin-2(1H)-one 4-oxide, the resulting solution being suitable for parenteral injection.

Example 8

An aqueous diluent suitable for parenteral use is prepared by mixing the following ingredients together:

| | For each ml. of diluent |
|---|---|
| Propylene glycol | ml __ 0.400 |
| Ethyl alcohol | ml __ 0.100 |
| Benzyl alcohol | ml __ 0.015 |
| Phthalimide | mg __ 4.00 |
| Sterile water for injection, q.s. to 1 ml. | |

1 ml. of the above diluent is mixed with 3 mg. of 7-chloro - 5 - (2 - chlorophenyl) - 3H - 1,4 - benzodiazepin-2(1H)-one, the resulting solution being suitable for parenteral injection.

Many of the compounds of Formula I and their 4-oxide and 4,5-dihydro derivatives are known. However, some of the compounds are not known, and accordingly, methods for their preparation are given below for purposes of completeness. However, it should be understood that neither the compounds of Formula I per se nor methods for their preparation are within the scope of the invention.

7-Chloro-5-(2-Chlorophenyl)-3H-1,4-Benzodiazepin-2(1H)-One o-Chlorobenzoylchloride (600 g.) was heated to 110° in a 5 l. three-necked flask equipped with thermometer, mechanical stirrer, and reflux condenser. To this p-chloroanilin (175 g.) was added under stirring. The mixture was then heated to 180° and zinc chloride (230 g.) was added. The temperature now was gradually raised to 220–230° and kept there until the HCl evolution had ceased (1–2 hours). After cooling to 120°, water was cautiously added and the mixture heated to reflux. The hot water layer was decanted and this procedure repeated 2 or 3 times.

The water insoluble brown mass was finally suspended in a mixture of 350 ml. water, 500 ml. acetic acid and 650 ml. conc. sulfuric acid and heated to reflux for 17 hours. After cooling, the homogeneous dark solution was poured into ice water, the mixture extracted with ether, the ether extract was neutralized with 2 N NaOH. Conc. of the ether solution and addition of a small amount of petroleum ether yielded 2-amino-2′, 5-dichlorobenzophenone in yellow crystals, which after recrystallization from ether petroleum ether yielded the pure compound, M.P. 88–89°.

2-amino-2′,5-dichlorobenzophenone (112 g.) was dissolved in a solution containing glycine ethyl ester hydrochloride (180 g.) in pyridine (500 ml.) and piperidine (5 ml.). After refluxing for 18 hours, the solvents were evaporated, the residue taken up in ether and the ether extract washed with water. The ether phase was repeatedly extracted with 2 N HCl thus separating the salt of the reaction product from the unreacted ketone which remains in the ether. The acidic aqueous solution was neutralized and extracted with ether to yield 7-chloro-5-(2-chlorophenyl)-3H-1,4-benzodiazepin-2(1H)-one. After recrystallization from methanol the product forms crystals melting at 199–201°.

7-Nitro-5-Phenyl-3H-1,4-Benzodiazepin-2(1H)-One

A mixture of 16.8 g. of 2-aminobenzophenone, 11.9 g. of glycine ethyl ester hydrochloride and 200 cc. of pyridine was heated to reflux. After one hour, 20 cc. of pyridine was distilled off. The solution was refluxed for 15 hours, then 11.9 g. of glycine ethyl ester hydrochloride was added and the refluxing was continued for an additional 4 hours. The reaction mixture was concentrated in vacuo, then diluted with ether and water. The reaction product, 5-phenyl-3H-1,4-benzodiazepin-2(1H) - one, crystallized out, was filtered off, and then recrystallized from acetone in the form of colorless rhombic prisms, M.P. 182–183°.

The above mentioned 5-phenyl-3H-1,4-benzodiazepine-2(1H)-one is not a part of this invention but its preparation is set forth above in order that this disclosure may be complete.

12 g. (0.05 mol.) of 5-phenyl-3H-1,4-benzodiazepin-2(1H)-one was dissolved in 16 cc. of concentrated sulfuric acid by stirring at room temperature for ½ hour. To the solution there was then added dropwise a cooled mixture of 3.5 cc. of concentrated sulfuric acid and 3.5 cc. of fuming nitric acid (90%—sp. gr.=1.50). The temperature of the reaction mixture slowly rose to 40°. The mixture was then stirred at 30° for 2 hours and allowed to stand at room temperature overnight. The reaction mixture was poured on 1 kg. of crushed ice with stirring and stirred for 2 hours. The yellow precipitate was then filtered off, washed with about 1.5 liters of ice water and dried overnight.

The crude product was ground and suspended in 200 cc. of water containing 50 cc. of 20% sodium acetate solution and a few drops of antifoam agent. After stirring for about ½ hours, the mixture was no longer acid congo red paper. The precipitate was then filtered off, washed with water and sucked dry. The product, 7,9-dinitro - 5 - phenyl-3H-1,4-benzodiazepin-2(1H)-one, was crystallized twice from 40% ethanol, and obtained as yellow needles melting at 240°.

48 g. (0.2 mol.) of 5-phenyl-3H-1,4-benzodiazepin-2(1H)-one was dissolved in 250 cc. of concentrated sulfuric acid by stirring at 15° for ½ hour. The solution was then cooled to 0° and a mixture of 9.1 cc. of fuming nitric acid (90%—sp. gr.=1.50) and 11.8 cc. of concentrated sulfuric acid was added dropwise with stirring, keeping the temperature of the reaction mixture between −5° and 0°. After completion of the addition of the nitric acid-sulfuric acid mixture, stirring was continued for 1 hour and the reaction mixture was stored in the refrigerator overnight.

The mixture was then added dropwise to 2 kg. of crushed ice with stirring and cooling, keeping the temperature at 0°. After 1 hour of stirring in the cold, 640 cc. of concentrated ammonium hydroxide was added dropwise at 0° to pH 8. Stirring was continued for ½ hour and the crude product was filtered off, washed with a small amount of ice water and sucked dry overnight. The crude product was suspended in a mixture of 100 cc. of methylene chloride and 1700 cc. of alcohol. 50 g. of decolorizing charcoal was added and the mixture was refluxed with stirring for 2 hours. After standing overnight at room temperature 15 g. of diatomaceous earth filter aid was added and the refluxing was resumed for 1½ hours. The mixture was filtered while hot. The clear, light yellow filtrate was concentrated in vacuo on the steam bath with stirring to about 600 cc. The concentrate was stirred and cooled in ice for about 2 hours; the precipitated crystalline product was filtered off, washed with some petroleum ether and sucked dry. The product, 7-nitro-5-phenyl-3H-1,4-benzodiazepin - 2(1H) - one, was recrystallized from a mixture of 1000 cc. of alcohol and 50 cc. of methylene chloride to obtain white prisms melting at 224–225°.

7-Nitro-5-(2-Chlorophenyl)-3H-1,4-Benzodiazepin-2(1H)-One

A stirred solution of 75 g. of 2-amino-2′-nitrobenzophenone in 700 ml. of hot concentrated hydrochloric acid was cooled to 0° and a solution of 21.5 g. of sodium nitrite in 50 ml. of water was added in the course of 3 hours. The temperature of the suspension was kept at 2–7° during the addition. The resulting clear solution was poured into a stirred solution of 37 g. of cuprous chloride in 350 ml. of hydrochloric acid 1:1. The solid which had formed after a few minutes was filtered off, washed with water and recrystallized from ethanol. Crystals of 2-chloro-2′-nitrobenzophenone melting at 76–79° were obtained.

A solution of 20 g. of 2-chloro-2′-nitrobenzophenone in 450 ml. of ethanol was hydrogenated at normal pressure and room temperature with Raney nickel. After uptake of ca. 6 liters of hydrogen the catalyst was filtered off, and the alcohol then removed in vacuo. The residue was distilled in a bulb tube at 0.4 mm. and a bath temperature of 150–165° giving a yellow oil. The oil was dissolved in alcohol, and on addition of water, needles of 2-amino-2′-chlorobenzophenone melting at 58–60° were obtained.

To a solution of 42 g. of 2-amino-2′-chlorobenzophenone in 500 ml. of benzene, 19 ml. of bromoacetyl bromide was added dropwise. After refluxing for 2 hours, the solution was cooled, washed with 2 N sodium hydroxide and evaporated. The residue was recrystallized from methanol giving crystals of 2-bromo-2'-(2-chlorobenzoyl)acetanilide melting at 119–121°.

To a solution of 14.5 g. of 2-bromo-2'-(2-chlorobenzoyl)acetanilide in 100 ml. of tetrahydrofuran, an excess of liquid ammonia (ca. 150 ml.) was added. The ammonia was kept refluxing with a Dry-Ice condenser for 3 hours after which time the ammonia was allowed to evaporate and the solution was poured into water. Crystals of 2-amino-2'-(2-chlorobenzoyl)acetanilide were collected, which after recrystallization from ethanol melted at 162–164°.

A solution of 3 g. of 2-amino-2'-(2-chlorobenzoyl)-acetanilide in 50 ml. of pyridine was refluxed for 24 hours after which time the pyridine was removed in vacuo. The residue was recrystallized from methanol and a mixture of dichloromethane and ether giving crystals of 5-(2-chlorophenyl)-3H-1,4-benzodiazepin-2(1H)-one melting at 212–213°.

The 5-(2-chlorophenyl)-3H-1,4-benzodiazepin-2(1H)-one mentioned above is not a part of this invention but intermediates therefor and its preparation are set forth above in order that this disclosure may be complete.

To a solution of 13.5 g. of 5-(2-chlorophenyl)-3H-1,4-benzodiazepin-2(1H)-one in 60 ml. of concentrated sulfuric acid, a solution of 5.5 g. of potassium nitrate in 20 ml. concentrated sulfuric acid was added dropwise. The solution then was heated in a bath at 45–50° for 2½ hours, cooled and poured on ice. After neutralizing with ammonia, the formed precipitate was filtered off and boiled with ethanol. A small amount of white insoluble material was then filtered off. The alcoholic solution on concentration yielded crystals of 7-nitro-5-(2-chlorophenyl)-3H-1,4-benzodiazepin-2(1H)-one which, after recrystallization from dichloromethane, melted at 238–240°.

*7-Nitro-5-(2'-Trifluoromethylphenyl)-3H-1,4-Benzodiazepin-2(1H)-One*

A solution of o-trifluoromethyl phenyl magnesium bromide was prepared in the usual manner from 50.0 g. of o-bromobenzotrifluoride, 5.55 g. of magnesium and 110 ml. of anhydrous ether. The Grignard reagent can also be prepared by reacting 39.7 g. of o-chlorobenzotrifluoride with 5.55 g. of magnesium in tetrahydrofurane. This solution was added with stirring at 20° C. over a period of 3 hours to a solution of 33.0 g. of 2-methyl-4H-3,1-benzoxazin-4-one in 300 ml. of methylene chloride. The resulting dark but clear solution was left at room temperature for 16 hours and was then poured over a mixture of 50 g. of ammonium chloride and 600 g. of crushed ice. Extraction with ether gave a crude reaction product which was directly hydrolyzed by refluxing for one hour in a mixture of 240 ml. of ethanol and 240 ml. of 3 N sodium hydroxide. After standing overnight, the reaction mixture was extracted with ether. The ether layer was washed with water and concentrated in vacuo yielding an oil. This was purified in two portions by chromatography on the 20-fold amount of neutral alumina (activity grade III; e.g., containing 6% of water). Elution with petroleum ether (60–70°) and a mixture of petroleum ether (60–70°) and ether (9:1) followed by crystallization from a mixture of ether and hexane yielded 2-amino-2'-trifluoromethylbenzophenone, melting at 94–96° (yellow prisms).

To a solution of 5.0 g. of 2-amino-2'-trifluoromethylbenzophenone in 25 ml. of anhydrous ether, cooled to 0° C., 1.7 ml. of bromoacetylbromide was added with stirring; a precipitation occurred and the yellow color of the solution gradually faded. The suspension containing 2-bromoacetamido-2'-trifluoromethylbenzophenone (not isolated) was stirred for half an hour at 0° C. and for two hours at room temperature. After that, 25 ml. of liquid ammonia was condensed into the flask, by introducing ammonia gas and using an efficient Dry Ice-acetone condenser. The resulting mixture was stirred and refluxed (B.P. of liquid ammonia) for 3 hours. After taking off the condenser, the ammonia was allowed to evaporate overnight. The reaction mixture was extracted with ether (the ether layers being washed 3 times with water) and yielded crude 2-amino-2'-(2-trifluoromethylbenzoyl)acetanilide. Recrystallization from a mixture of 15 ml. of benzene and 15 ml. of hexane gave the pure product, melting at 141–142° C. (colorless, rhombic plates).

3.0 g. of 2-amino-2'-(2-trifluoromethylbenzoyl)acetanilide was heated in an open tube for 15 minutes to 200–205° C., using an oil bath. Water was given off. On cooling, a brown glass was obtained which, on crystallization from a mixture of methanol and ether, gave crude 5 - (2 - trifluoromethylphenyl) - 3H - 1,4 - benzodiazepin-2(1H)-one. The mother liquor was evaporated to dryness, dissolved in benzene and chromatographed on 60 g. of neutral alumina (activity grade III, e.g., containing 6% of water). Elution with benzene (300 ml.) gave a product which could be crystallized to give some starting material. Then, with a benzene-ether-(1:1)-mixture (400 ml.), a crude product could be eluted. This, on crystallization from ether-hexane, gave the pure 5-(2-trifluoromethylphenyl)-3H-1,4-benzodiazepin-2(1H)-one, melting at 187–188° (almost colorless prisms).

7.3 g. of 5-(2-trifluoromethylphenyl)-3H-1,4-benzodiazepin-2(1H)-one were dissolved at 0° in 58.4 ml. of concentrated sulfuric acid. To this, over a period of about 15 minutes, 3.22 g. of potassium nitrate were added with stirring. After keeping the reaction mixture for 30 minutes at 0°, it was allowed to stand for one hour at 25°. Finally, it was heated to 50° for 3 hours. After standing overnight at 25°, the yellow solution was poured over 250 g. of ice and the precipitate obtained, filtered and thoroughly washed with diluted ammonium hydroxide solution, diluted acetic acid and water. Crystallization from acetone-benzene of the thus-obtained crude product afforded the 7-nitro-5-(2'-trifluoromethylphenyl)-3H-1,4-benzodiazepin-2(1H)-one. From the mother liquor and the filtrate, a second crop could be obtained. An analytical sample was prepared by recrystallization from acetone-methanol. Slightly yellow prisms (hexagonal), melting at 233–234°, were obtained.

*7-Nitro-5-(2-Fluorophenyl)-3H-1,4-Benzodiazepin-2(1H)-One*

A mixture of 176 g. of ortho-fluoro benzoyl chloride and 64 g. of para-chloroaniline was stirred and heated to 180°, at which temperature 87 g. of zinc chloride was introduced, the temperature raised to 200–205° and maintained there for forty minutes. The golden colored melt was quenched by the careful addition of 500 ml. of 3 N hydrochloric acid and the resulting mixture refluxed for five minutes. The acid solution was decanted and the process repeated three times to remove all orthofluorobenzoic acid. The grey granular residue was dissolved in 300 ml. of 75 percent (vol./vol.) sulfuric acid and refluxed for forty minutes to complete hydrolysis. The hot solution was poured over 1 kg. of ice and diluted to two liters with water. The organic material was extracted with four 300 ml. portions of methylene chloride, and the combined extracts subsequently washed with two 500 ml. portions of 3 N hydrochloric acid to remove traces of para-chloroaniline, three 500 ml. portions of 5 N sodium hydroxide solution to remove ortho-fluorobenzoic acid, and finally two 200 ml. portions of saturated brine solution. The combined methylene chloride extracts were dried over anhydrous sodium sulfate and the solvent removed to give the crude 2-amino-5-chloro-2'-fluorobenzophenone which upon recrystallization from methanol formed yellow needles melting at 94–95°.

50.0 g. of 2-amino-5-chloro-2'-fluorobenzophenone in 300 cc. of tetrahydrofuran was hydrogenated at atmospheric pressure in the presence of 10 g. of charcoal (Norite), 30.0 g. of potassium acetate and 2.5 cc. of a 20 percent palladous chloride solution (20 percent by weight of palladium). After an initiation period varying from ten minutes to an hour, hydrogen uptake was rapid and stopped completely after the absorption of the theoretical amount. Filtration of the catalyst over a "Hyflo" pad and removal of the solvent left a yellow crystalline residue. The crude mixture of ketone and potassium acetate was partitioned between methylene chloride (300 cc.) and water (1 l.). The layers were separated and the water layer washed with methylene chloride (3 x 50 cc.). The organic layers were combined, washed with 3 N sodium hydroxide solution (2 x 50 cc.), water (3 x 100 cc.), dried over anhydrous sodium sulfate and filtered. The solvent was removed and the product recrystallized from ethanol to give 2-amino-2'-fluorobenzophenone as yellow prisms melting at 126–128°.

A solution of 21.5 g. of 2-amino-2'-fluorobenzophenone in 500 cc. of ether was treated with 20 cc. of a 20 percent (v./v.) solution of bromoacetyl bromide in ether. The mixture was shaken and allowed to stand for five minutes and then washed with water (20 cc.). The process was repeated five times. The final solution was washed thoroughly with water (5 x 500 cc.) and concentrated to 100 cc. The crystals were filtered and recrystallized from methanol to give 2-bromoacetamido-2'-fluorobenzophenone as white needles melting at 117–118.5°.

A solution of 23.7 g. of 2-bromoacetamido-2'-fluorobenzophenone in tetrahydrofuran (100 cc.) was added to liquid ammonia (approximately 500 cc.), and allowed to evaporate overnight. The residue was treated with water (1 l.) and the crystals filtered off and refluxed in toluene (100 cc.) for thirty minutes. The mixture was treated with decolorizing carbon (Norite) and filtered over "Hyflo." The solution was concentrated to a small volume (25 cc.) cooled, diluted with 20 cc. of ether and allowed to stand. The product was recrystallized from acetone/hexane to give 5-(2-fluorophenyl)-3H-1,4-benzodiazepin-2-(1H)-one as white needles melting at 180–181°.

23.8 g. of 5-(2-fluorophenyl)-3H-1,4-benzodiazepin-2 (1H)-one was dissolved in 50 cc. of concentrated sulfuric acid at 0°. To the resulting mixture there was then added dropwise with stirring a solution of 7.1 g. of potassium nitrite in 20 cc. of concentrated sulfuric acid. The mixture was stirred for 2½ hours at 0° and then diluted with 300 g. of ice. The resulting solution was made alkaline with concentrated ammonium hydroxide solution, keeping the temperature at 0°. The formed suspension was extracted thoroughly with methylene chloride (6 x 100 cc.). The organic layers were combined, washed with saturated brine solution, dried over anhydrous sodium sulfate, and filtered. Removal of the solvent yielded a brown gum which was taken up in a small amount of methylene chloride and filtered through a pad of grade I alumina. The alumina was eluted with methylene chloride, the solvent removed, and the residue crystallized from acetone/hexane to yield 7-nitro-5-(2-fluorophenyl)-3H-1,4-benzodiazepin-2(1H)-one as white needles melting at 210–211°.

A solution of 11 g. of this product in a mixture of 150 ml. of ethanol and 100 ml. of 3 N hydrochloric acid was heated on a steam bath for 12 hours. The mixture was diluted with 100 ml. of water and allowed to cool to room temperature. The crystalline product was filtered, washed with water, dissolved in 200 ml. of methylene chloride, dried over anhydrous sodium sulfate, filtered, concentrated to a small volume, and diluted with ether, whereupon the product crystallized yielding 2-amino-5-nitro-2'-fluorobenzophenone as yellow needles melting at 154–158°.

20.2 g. of the above mentioned 7-nitro-5-(2-fluorophenyl)-3H-1,4-benzodiazepin-2(1H)-one was dissolved in 60 cc. of N,N-dimethyl formamide to which was then added 3.49 g. of a 50% suspension of sodium hydride in heavy mineral oil. The mixture was allowed to stir for 15 minutes in the cold, 11.2 g. of methyl iodide was added and the solution was stirred for a further 20 minutes. Solvent was removed under reduced pressure to give an oil which was partitioned between water and methylene chloride (1 l./300 cc.), the water layer was extracted with methylene chloride (5 x 200 cc.), the organic layers combined, washed with water (2 x 100 cc.), 3 N hydrochloric acid (1 x 50 cc.), water (3 x 100 cc.), dried over anhydrous sodium sulfate and filtered. Removal of the solvent gave an oil which was taken up in ether and filtered through a pad of Woelm grade I alumina. The eluent was concentrated and the residue was crystallized from methylene chloride/hexane yielding 1-methyl-7-nitro - 5 - (2-fluorophenyl)-3H-1,4-benzodiazepin-2(1H)-one as pale yellow needles melting at 166–167°.

80 g. of sodium nitrite were added slowly with stirring to 460 ml. of concentrated sulfuric acid. After heating to 70°, a clear solution was obtained. This solution was cooled and 200 g. of 2-chloro-5-trifluoromethylaniline were slowly added at a temperature between 10 and 20°. The reaction mixture was stirred for one hour at 20° and then poured onto a mixture of 200 g. of sodium chloride and 1.6 kg. of ice. Excess sodium chloride was filtered off. A solution of 280 g. of zinc chloride in 300 ml. of water was added to the filtrate whereupon a zinc chloride double salt of the corresponding diazonium compound precipitated. After standing overnight at 0°, the double salt was filtered off and washed with a cold saturated salt solution.

To a solution of 120 g. of sodium cyanide and 72 g. of cuprous cyanide in 300 ml. of water were added with stirring and cooling with ice, 291 g. of the wet zinc chloride double salt. After the addition of 24 g. of sodium carbonate, the mixture was first stirred for one hour at 20° and then at 70° for an additional ½ hour. The reaction mixture was cooled and extracted with ether to obtain crude 2-chloro-5-trifluoromethylbenzonitrile. The product was purified by steam distillation and crystallization of the organic part of the distillate from hexane to give the pure compound, M.P. 39–40°.

To a solution of phenyl magnesium bromide, prepared from 9.5 g. of magnesium, 58.5 g. of bromobenzene and 500 ml. of anhydrous ether, was added with stirring a solution of 39 g. of 2-chloro-5-trifluoromethylbenzonitrile in 200 ml. of benzene. 400 ml. of solvent were distilled off and the reaction mixture was then refluxed for 16 hours. The Grignard complex was decomposed with 40 g. of ammonium chloride and 200 g. of ice. The mixture was then extracted with benzene. 2-chloro-5-trifluoromethylbenzophenone imine hydrochloride was precipitated from the benzene solution by the addition of 40 ml. of concentrated hydrochloric acid. The product was filtered off, washed with benzene and dried in vacuo, M.P. 248–251°, and upon further purification melted at 250–262°.

60 g. of 2-chloro-5-trifluoromethylbenzophenone imine hydrochloride were refluxed overnight with a mixture of 300 ml. of toluene and 300 ml. of 25% sulfuric acid while stirring. The toluene layer was separated, washed with water, dried, concentrated in vacuo and the residue crystallized from hexane to yield pure 2-chloro-5-trifluoromethylbenzophenone, M.P. 39–40° (corr.).

50 g. of 2-chloro-5-trifluoromethylbenzophenone and 500 ml. of concentrated aqueous ammonia were reacted in a closed vessel for 10 hours at 140° in the presence of 10 g. of cuprous chloride catalyst. The reaction product was extracted with ether. The ether extract was concentrated in vacuo, the residue dissolved in hexane and purified by chromatography using a 10 fold amount of neutral alumina (Brockmann activity state II). Elution with a hexane-ether mixture (1:1) and evaporation of the solvent gave 2-amino-5-trifluoromethylbenzophenone which was recrystallized from hexane to give yellow crystals, M.P. 81–82° (corr.).

2 g. of 2-amino-5-trifluoromethylbenzophenone in 50 ml. of pyridine were refluxed for 1½ hours with 2.0 g. of glycine ethyl ester hydrochloride. After that, another 1.0 g. of glycine ethyl ester hydrochloride in 2 ml. of pyridine were added. Then 3 ml. of the solvent were distilled off. Refluxing was continued for an additional 2½ hours. The reaction mixture was extracted with benzene, the organic layer was washed with water and dried over sodium sulfate. After evaporation of the solvent, a crude oil was obtained which was dissolved in hexane. After 2 days at 0°, the precipitated pure crystalline 7-trifluoromethyl-5-phenyl-3H-1,4-benzodiazepin-2(1H)-one was filtered off. It melted at 198–199°.

By reducing 7-trifluoromethyl-5-phenyl-3H-1,4-benzodiazepin-2-(1H)-one with one molar proportion of hydrogen in glacial acetic acid at room temperature and atmospheric pressure in the presence of platinum oxide catalyst 7-trifluoromethyl-5-phenyl-4,5-dihydro-3H-1,4-benzodiazepin-2(1H)-one is obtained.

By using α-alanine methyl ester hydrochloride instead of the glycine ethyl ester hydrochloride, 7-trifluoromethyl-3-methyl-5-phenyl-3H-1,4-benzodiazepin-2(1H)-one is obtained.

It is to be noted that the term "dimethyl acetamide" as used herein means N,N-dimethyl acetamide.

We claim:

1. A parenterally acceptable aqueous diluent solution comprising about 40% propylene glycol, about 10% ethyl alcohol, about 1.5% benzyl alcohol, about 5% sodium benzoate, about 43.5% water, and from about 2 mg. to about 8 mg. of 7-chloro-5-phenyl-1-methyl-3H-1,4-benzodiazepin-2(1H)-one per ml. of the above solution.

2. A parenterally acceptable aqueous diluent solution comprising about 40% propylene glycol, about 10% ethyl alcohol, about 1.5% benzyl alcohol, about 10% dimethyl acetamide, about 38.5% water, and from about 2 mg. to about 10 mg. of 7-chloro-5-phenyl-1-methyl-3H-1,4-benzodiazepin-2(1H)-one per ml. of the above solution.

3. An aqueous diluent composition suitable for parenteral injection for solubilizing a benzodiazepine selected from the group consisting of (A) a benzodiazepine of the formula

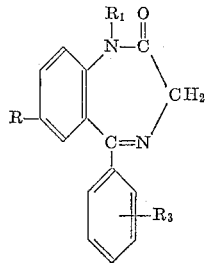

wherein R is selected from the group consisting of halogen, trifluoromethyl, and nitro, $R_1$ is selected from the group consisting of hydrogen and lower alkyl, and $R_3$ is selected from the group consisting of hydrogen, trifluoromethyl, and halogen; (B) 4-oxide derivatives of (A), and (C) 4,5-dihydro derivatives of (A), comprising by weight, based on said composition, (a) from about 30% to about 80% water
(b) from 0% to about 70% propylene glycol
(c) from 0% to about 70% glycerine
(d) a complexing agent selected from the group consisting of
  (1) from about 1% to about 10% of a substance selected from the group consisting of sodium benzoate and a mixture of sodium benzoate and benzoic acid containing up to about 50% benzoic acid based on the weight of the mixture
  (2) from about 1% to about 10% of a substance selected from the group consisting of sodium mandelate and a mixture of sodium mandelate and mandelic acid containing up to about 50% benzoic acid based on the weight of the mixture
  (3) from about 1% to about 4% gentisic acid ethanolamide
  (4) from about 2% to about 20% dimethyl acetamide
  (5) from about 0.5% to about 4% polyoxyethylene sorbitan mono-oleate
  (6) from about 0.1% to about 0.4% phthalimide
  (7) from about 1% to about 10% of a substance selected from the group consisting of sodium salicylate and a mixture of sodium salicylate and salicylic acid containing up to about 50% salicylic acid based on the weight of the mixture;

wherein the quantity of propylene glycol plus glycerine is in the range of from about 20% to about 70%.

4. A diluent composition according to claim 3 which contains from about 1% to about 40% ethanol.

5. A composition according to claim 3 wherein the complexing agent is from about 1% to about 10% sodium benzoate.

6. A composition according to claim 3 wherein the complexing agent is from about 1% to about 10% sodium mandelate.

7. A composition according to claim 3 wherein the complexing agent is from about 1% to about 10% of a mixture of sodium benzoate and benzoic acid containing up to about 50% benzoic acid based on the weight of the mixture.

8. A composition according to claim 3 wherein the complexing agent is from about 1% to about 10% of a mixture of sodium mandelate and mandelic acid containing up to about 50% benzoic acid based on the weight of the mixture.

9. A composition according to claim 3 which contains a benzodiazepine selected from the group consisting of (a) a benzodiazepine of the formula

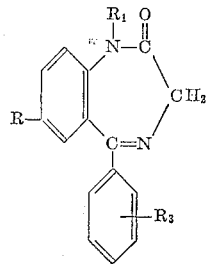

wherein R is selected from the group consisting of halogen, trifluoromethyl, and nitro, $R_1$ is selected from the group consisting of hydrogen and lower alkyl, and $R_3$ is selected from the group consisting of hydrogen, trifluoromethyl, and halogen; (b) 4-oxide derivatives of (a), and (c) 4,5-dihydro derivatives of (a).

10. A composition according to claim 9 which contains from about 0.5 mg. to about 10 mg. of said benzodiazepine per ml. of diluent.

11. A composition according to claim 9 which contains from about 1 mg. to about 5 mg. of said benzodiazepine per ml. of diluent.

References Cited in the file of this patent

UNITED STATES PATENTS

| | | |
|---|---|---|
| 2,600,344 | Van Meter | June 10, 1952 |
| 2,765,256 | Beals | Oct. 2, 1956 |
| 2,800,426 | Kaellner | July 23, 1957 |

OTHER REFERENCES

Science, vol. 78, No. 2030, November 1933, p. 6.
Bulletin of the National Formulary Committee, vol. II, November, December 1943, Nos. 11 and 12, p. 201.
Leffingwell: Am. J. of Pharm., February 1944, pp. 60.
Hoffer: Chem. Abst., vol. 43, page 3979(c), 1949.

(Other references on following page)

OTHER REFERENCES

Dow: Drug and Cosmetic Ind., February 1953, advertisement facing page 200.
Eisner: Chem. Abst., vol. 47, page 11522(h), 1953.
Drug Trade News, vol. 28, No. 2, p. 52, January 1953.
Crooks: Chem. Abst., vol. 48, 1954, p. 6657.
Brumfield: Am. J. Pharmacy, page 70, vol. 128–129, 1956–1957.
Farbwerke: Chem. Abst., vol. 54, 20104(d), 1960.
Fischl: Chem. Abst., vol. 53, 1959, p. 10674(h).
CMC, Reinhold Pub. Corp., 10th ed., 1959, pp. 22 and 23.
Sternback: J. Org. Chem., vol. 26, 4936–4941, 1961.

UNITED STATES PATENT OFFICE
CERTIFICATE OF CORRECTION

Patent No. 3,123,529                                March 3, 1964

John Kariss et al.

It is hereby certified that error appears in the above numbered patent requiring correction and that the said Letters Patent should read as corrected below.

Column 2, line 44, for "alsewhere" read -- elsewhere --; column 4, line 17, after "Example 5" insert the following:

> An aqueous diluent suitable for parenteral use is prepared by mixing the following ingredients together:

column 6, line 8, after "acid" insert -- to --.

(SEAL)          Signed and sealed this 14th day of July 1964

Attest:

ESTON G. JOHNSON                           EDWARD J. BRENNER
Attesting Officer                                Commissioner of Patents